United States Patent [19]

Forrest

[11] 4,329,752

[45] May 18, 1982

[54] CARGO LOADING APPARATUS

[76] Inventor: William J. Forrest, 3400 N.W. Expressway, Oklahoma City, Okla. 73112

[21] Appl. No.: 205,899

[22] Filed: Nov. 12, 1980

[51] Int. Cl.³ .............................................. E01D 1/00
[52] U.S. Cl. .................................. 14/69.5; 414/494; 414/500; 280/5.24
[58] Field of Search ............... 14/69.5, 71.3; 414/494, 414/500; 280/5.24

[56] References Cited

U.S. PATENT DOCUMENTS

| | | | |
|---|---|---|---|
| 976,666 | 11/1910 | Lucas | 14/69.5 X |
| 1,250,505 | 12/1917 | Reasoner | 414/500 |
| 1,384,713 | 7/1921 | Stephens | 14/69.5 X |
| 1,562,364 | 11/1925 | Reasoner | 414/500 |
| 1,567,478 | 7/1925 | Bonnez | 414/500 |
| 2,004,095 | 6/1935 | Hankins et al. | 414/345 |
| 2,459,275 | 1/1949 | Gates | 280/5.24 |
| 2,534,156 | 12/1950 | Wyatt et al. | 414/500 |
| 2,588,001 | 3/1952 | Holland | 414/477 |
| 2,607,937 | 8/1952 | Stone | 14/69.5 |
| 2,665,020 | 1/1954 | Whittle | 414/500 |
| 2,681,195 | 6/1954 | Gleaves | 248/536 |
| 2,745,566 | 5/1956 | Bouffard | 414/494 |
| 2,823,818 | 2/1958 | Chastain et al. | 414/494 |
| 2,936,985 | 5/1960 | Doerr et al. | 108/55.1 |
| 3,032,217 | 5/1962 | Musson et al. | 254/3 R |
| 3,034,674 | 5/1962 | Bertoglio et al. | 414/494 |
| 3,137,511 | 6/1964 | Weil et al. | 280/5.24 |
| 3,159,295 | 12/1964 | Love | 414/494 |
| 3,330,432 | 11/1967 | Blackburn et al. | 414/494 |
| 3,471,048 | 10/1969 | Terho | 410/13 |
| 3,712,491 | 1/1973 | Kreutzer | 414/494 |
| 3,716,157 | 2/1973 | Mittler et al. | 414/494 |
| 3,804,275 | 4/1974 | Lee | 414/786 |
| 3,905,334 | 9/1975 | Stevenson | 219/20 |
| 3,912,290 | 10/1975 | Rich | 280/9 |
| 4,009,791 | 3/1977 | Derain | 144/71 |
| 4,034,716 | 7/1977 | Fleming | 219/82 |
| 4,044,907 | 8/1977 | Craft | 414/25.5 |

FOREIGN PATENT DOCUMENTS

| | | |
|---|---|---|
| 982988 | of 1976 | Canada . |
| 988971 | of 1976 | Canada . |
| 1932354 | 2/1970 | Fed. Rep. of Germany . |
| 2225021 | of 1973 | Fed. Rep. of Germany . |
| 160437 | of 1921 | United Kingdom . |
| 727011 | of 1955 | United Kingdom . |
| 1234147 | of 1971 | United Kingdom . |
| 1385997 | of 1975 | United Kingdom . |

*Primary Examiner*—Nile C. Byers, Jr.
*Attorney, Agent, or Firm*—Dunlap & Codding

[57] ABSTRACT

The present invention relates to a cargo loading apparatus for loading a cargo disposed on a first level onto a deck disposed on a second level generally above the first level, the deck having a cargo supporting surface and an end. The cargo loading apparatus includes a platform with a cargo supporting surface for supporting the cargo to be loaded onto the deck, a base which is hingedly connected to the platform, and means for pulling the base and the platform connected thereto onto the cargo supporting surface of the deck. The base is of a sufficient size such that the base and the platform are positionable in an initial loading position wherein the platform is supported generally on the first level and the base extends from the platform generally toward the deck to a position wherein the end of the base is disposed generally above the second level and a portion of the base engages the end of the platform. The base cooperates to raise the platform from the first level to the second level and subsequently onto the cargo supporting surface of the deck as the base and the platform connected are pulled onto the cargo supporting surface of the deck.

9 Claims, 6 Drawing Figures

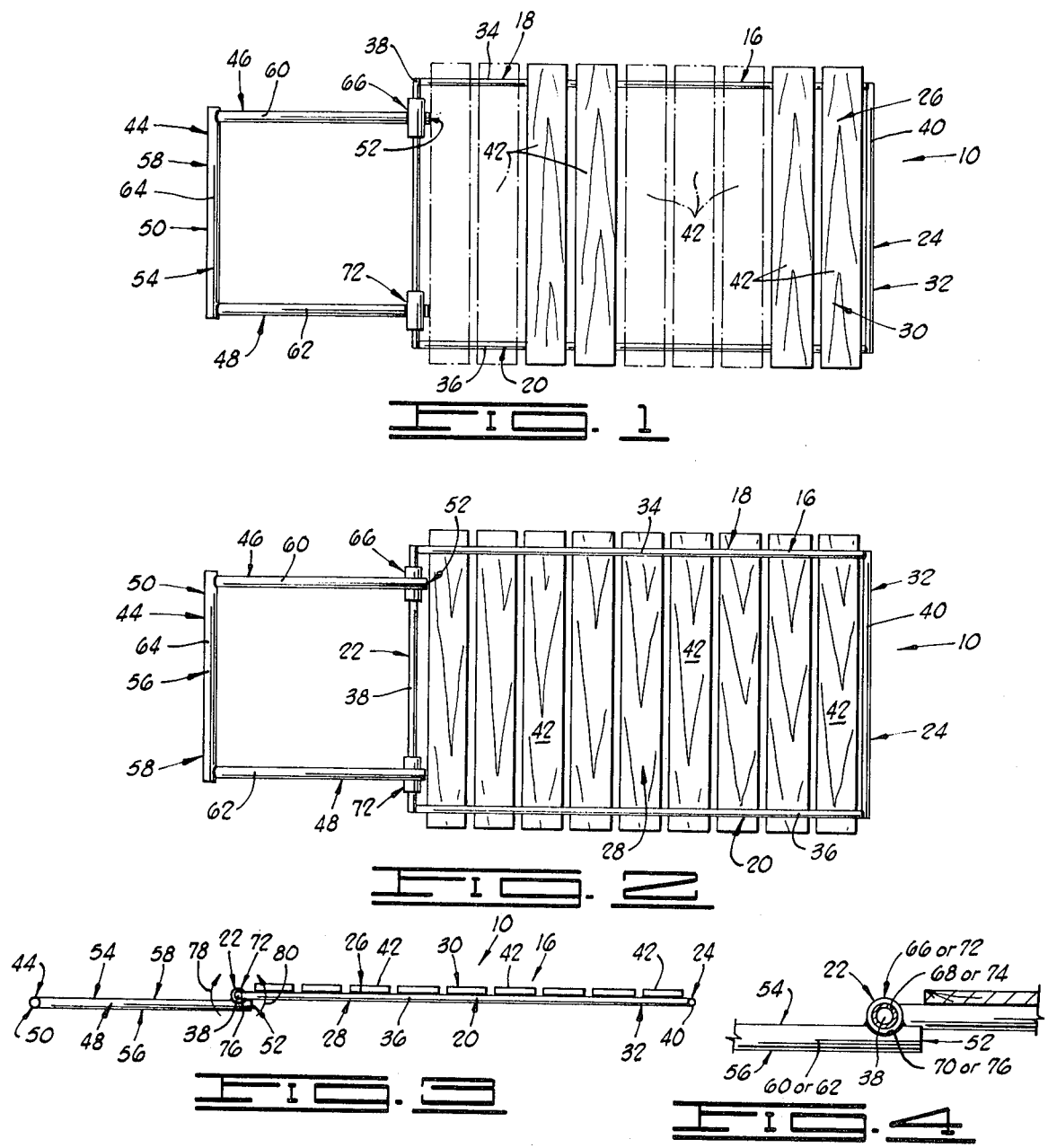

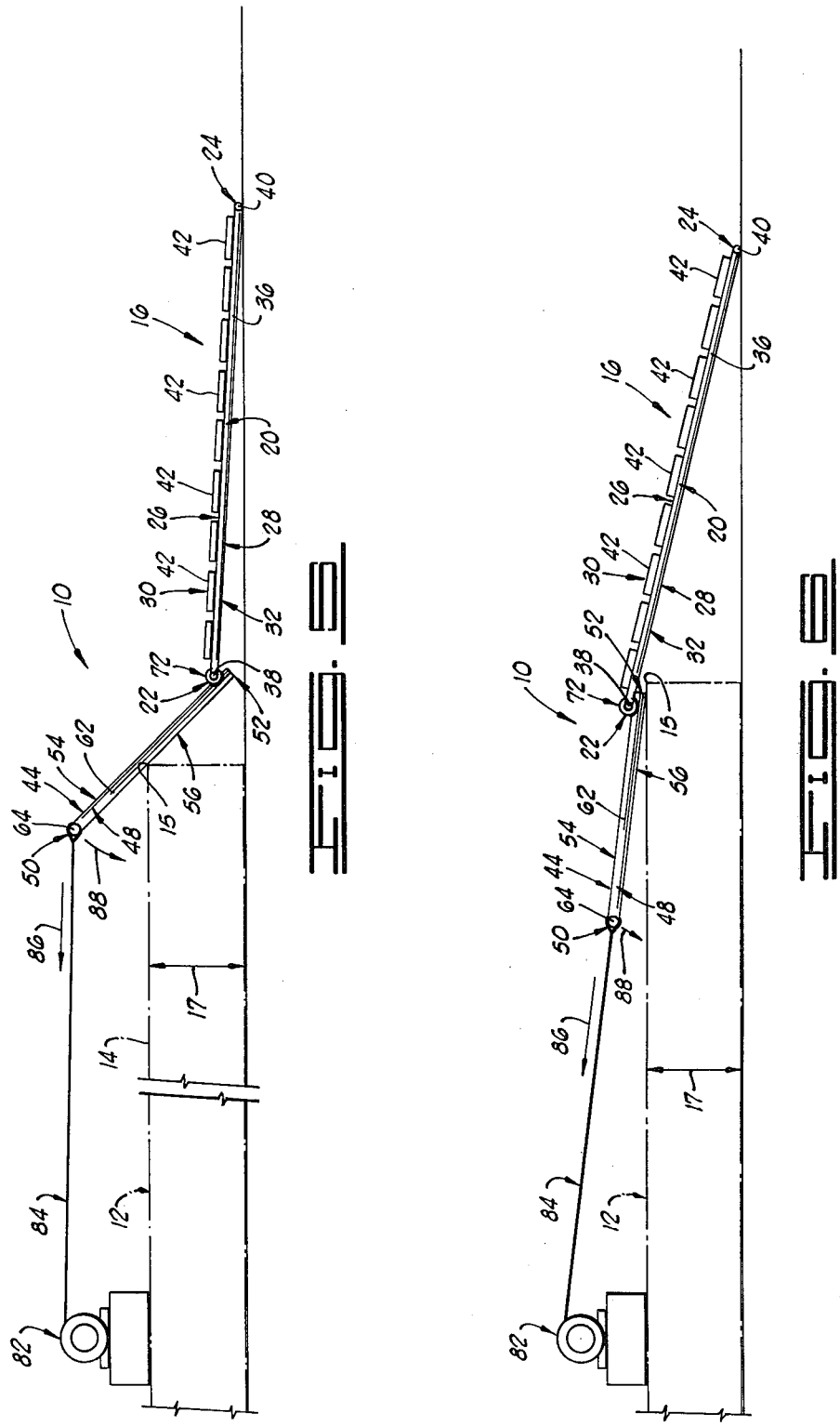

CARGO LOADING APPARATUS

BACKGROUND OF THE INVENTION

1. Field of the Invention

The present invention relates generally to apparatus for loading cargo and, more particularly, but not by way of limitation, to a cargo loading apparatus for loading cargo from a first level to a second level.

2. Brief Description of the Prior Art

U.S. Pat. No. 3,716,157, issued to Mittler, et al., disclosed a frame upon which cargo is disposed and which has extending from the forward end of the frame a pair of spars attached to the forward end of the frame. To load the frame and the cargo on the truck, the spars were pivoted upwardly about the forward end of the frame by a hydraulic cylinder so that the forward ends of the spars rested on the pivoting bed of the truck. The spars were then moved into alignment with the frame to lift the cargo from the ground and the bed of the truck was pivoted into alignment with the spars and frame. The frame and cargo were then drawn onto the bed of the truck by means of the cable passing around the cargo and a winch on the forward end of the truck. The bed of the truck was continuously realigned with the frame and spars during the time the frame was drawn onto the bed.

U.S. Pat. No. 2,588,001, issued to Holland, disclosed a device for placing a small house on the bed of a truck. For this purpose, the bed of the truck pivoted about the rear end of the truck and rails pivotally attached to the bed could be extended under the house to be moved via the truck. When the bed of the truck was pivoted toward its horizontal position, the rails lifted the house and the bed and rails formed a ramp up which the house could be drawn by means of a cable passing about the house and extending to a winch.

U.S. Pat. No. 4,044,907, issued to Craft, disclosed a cradle which was pivotally attached to the rear end of a truck so that a chain attached to the lower end of the cradle and extending partially around a bail of hay would pull the hay into the cradle and pivot the cradle into the back of the truck when a cable attached to the free end of the chain and extending the remainder of the distance about the hay was drawn forwardly by a wench.

U.S. Pat. No. 3,912,290, issued to Rich, disclosed a foldable sled for supporting the body of an animal.

U.S. Pat. No. 2,936,985, issued to Doerr, et al., disclosed a pallet having swingable end sections.

U.S. Pat. No. 2,459,275, issued to Gates, disclosed movable tubular members on a hand truck which engage the edge of a step to assist in raising the hand truck onto the step.

French Pat. No. 1,303,570, disclosed a trailer loading device having a cradle which was pivotally and slidably attached to the trailer. When a load was placed on one side of the cradle and tied thereto, a cable attached to the other side of the cradle could be used to first pivot the cradle so as to lift the load and, subsequently, to draw the cradle and load onto the trailer.

Canadian Pat. No. 988,971, disclosed a folding; that is, articulated, load carrying device, a sled.

U.S. Pat. No. 3,330,432, issued to Blackburn, et al., and U.S. Pat. No. 2,745,566, issued to Bouffard, British Pat. No. 1,385,997, and German Pat. No. 2,225,021, each generally relate to tilting truck beds up which a load can be drawn. For example, the Bouffard patent disclosed the loading of a platform onto a truck by tilting the bed of the truck to permit the platform to be drawn onto the bed via a cable and winch.

U.S. Pat.No. 2,534,156, issued to Wyatt, et al., U.S. Pat. No. 1,250,505, issued to Reasoner, U.S. Pat. No. 1,567,478, issued to Vonnez, et al., U.S. Pat. No. 1,562,364, issued to Reasoner, U.S. Pat. No. 3,034,674, issued to Bertoglio, et al., U.S. Pat. No. 3,159,295, issued to Love, U.S. Pat. No. 3,471,048, issued to Terho, and U.S. Pat. No. 2,823,818, issued to Chastain, et al., British Pat. Nos. 1,234,147, 160,437, and 727,001, and German Pat. No. 1,932,254, each generally relate to systems in which lower portions of the forward end of a pallet or sled is engaged by a cable which extends to a winch at the forward end of the bed of a truck. Such connection to the pallet or sled causes the forward end thereof to be initially raised to the level of the bed of the truck when the cable is initially taken up and subsequently drawn onto the bed of the truck as take-up of the cable continues. For example, U.S. Pat. No. 1,562,364, issued to Reasoner, disclosed such a system which was used to load a sled loaded with sugar cane or the like. To facilitate such a system of loading, the bed of the truck can be tiltable as disclosed in U.S. Pat. No. 3,034,674, issued to Bertoglio, et al., or tilting members can be disposed at the rear end of the bed of the truck as has been disclosed in U.S. Pat. No. 3,159,295, issued to Love.

U.S. Pat. No. 3,137,511, issued to Weil, U.S. Pat. No. 2,665,020, issued to Whittle, U.S. Pat. No. 2,004,095, issued to Hankins, et al., U.S. Pat. No. 3,712,491, issued to Kreutzer, U.S. Pat. No. 3,032,217, issued to Musson, et al., U.S. Pat. No. 4,009,791, issued to Derain, U.S. Pat. No. 3,804,275, issued to Lee, U.S. Pat. No. 4,034,716, issued to Fleming, U.S. Pat. No. 2,681,193, issued to Gleaves, and U.S. Pat. No. 3,905,334, issued to Stevenson, and Canadian Pat. No. 982,288, each generally relate to various types of loading handling devices and methods.

U.S. Pat. No. 3,957,166, issued to Durham, disclosed a device which included side rails, a power winch, and hydraulic couplings to accommodate the loading and unloading of containers.

BRIEF DESCRIPTION OF THE DRAWINGS

FIG. 1 is a top plan view of a cargo loading apparatus which is constructed in accordance with the present invention.

FIG. 2 is a bottom plan view of the cargo loading apparatus of FIG. 1.

FIG. 3 is a side elevational view of the cargo loading apparatus of FIGS. 1 and 2.

FIG. 4 is an enlarged partial sectional view showing a typical first or second hinge member forming the hinged connection between the base and the platform.

FIG. 5 is a side elevational view showing the cargo loading apparatus of FIGS. 1 and 2 in an initial loading position with respect to a deck.

FIG. 6 is a view similar to FIG. 5, but showing the cargo loading apparatus in a position wherein the base has been pulled a distance toward the cargo loading surface of the deck.

BRIEF DESCRIPTION OF THE PREFERRED EMBODIMENT

Shown in FIGS. 1, 2, and 3, and designated therein by the general reference numeral 10, is a cargo loading apparatus which has been constructed in accordance with the present invention. The cargo loading apparatus 10 is constructed to load a cargo from a first level onto a cargo supporting surface 12 of a deck 14 having an end 15 which is disposed at a second level a distance 17 generally above the first level, the deck 14 and cargo supporting surface 12 being shown in dashed lines in FIGS. 5 and 6. The deck 14 could be the bed of a truck, for example, and, in this instance, the cargo loading apparatus 10 could be utilized to a load cargo from a ground level (the first level) onto the bed of the truck (onto the cargo supporting surface 12 of the deck 14). The cargo loading apparatus 10 has been found to be useful and efficient in loading large animals, such as a cow, for example, which cannot walk onto the supporting surface of the bed of a truck.

The cargo loading apparatus 10 includes a platform 16 having a first side 18, a second side 20, a first end 22, a second end 24, an upper side 26, and a lower side 28. A cargo supporting surface 30 extends generally between the first and second sides 18 and 20 and generally between the first and second ends 22 and 24, the cargo supporting surface 30 generally forming the upper side 26 of the platform 16.

The platform 16 is generally rectangularly shaped and comprises a platform frame 32 which is constructed of four structural members 34, 36, 38, and 40, the four structural members 34, 36, 38, and 40 are interconnected by such means as welding, for example, to form the rectangularly shaped platform 16. As shown in FIGS. 1, 2, 3, and 4, each structural member 34, 36, 38, and 40 has a generally circularly shaped cross section. The structural member 34 extends along and generally forms the first side 18, the structure member 36 extends along and generally forms the second side 20, the structural member 38 extends along and generally forms the first end 22, and the structural member 40 extends along and generally forms the second end 24.

The cargo supporting surface 30 comprises a plurality of rails 42, each rail 42 extending generally between the first and the second sides 18 and 20 of the platform 16. Only some of the rails 42 are designated by reference numerals in the drawings. One end portion of each rail 42 is securely connected to the structural member 34 and the opposite end portion of each rail 42 is securedly connected to the structural member 36. As shown in the drawings, the rails 42 are spaced a distance apart and the spacing between the rails 42 is sufficiently small to prevent portions of the cargo from falling through such spacing. The cargo supporting surface 30 could be constructed of a solid, single member, rather, than the spaced-apart rails 42, which may be desirable in some applications. In general, however, the cargo supporting surface 30 is constructed to support the cargo to be loaded onto the cargo supporting surface 12 of the deck 14.

The cargo loading apparatus 10 includes a base 44 having a first side 46, a second side 48, a first end 50, a second end 52, an upper side 54, and a lower side 56. The base 44 is generally rectangularly shaped and comprises a base frame 58 which is constructed generally of three structural members 60, 62, and 64. As shown in FIGS. 1, 2, 3, and 4, each structural member 60, 62, and 64 has a generally circularly shaped cross section. The structural member 60 extends along and generally forms the first side 46, the structural member 62 extends along and generally forms the second side 48, and the structural member 64 extends generally along and forms the first end 50.

A first hinge member 66 is securely connected to the structural member 60 generally near the second end 52 of the base 44 and generally near the first side 46 of the base 44. The first hinge member 66 has a generally cylindrical shape and includes an opening 68 extending therethrough and intersecting the opposite ends thereof, the first hinge member 66 being oriented with respect to the structural member 60 such that the opening 68 extends generally transversely with respect to the structural member 60. A portion of the structural member 60 is removed to provide a recessed portion 70 in the upper surface of the structural member 60 and the first hinge member 66 is disposed in the recessed portion 70.

A second hinge member 72 is securely connected to the structural member 62 generally near the second end 52 of the base 44 and generally near the second side 48 of the base 44. The second hinge member 72 has a generally cylindrical shape and includes an opening 74 extending therethrough and intersecting the opposite ends thereof, the second hinge member 72 being oriented with respect to the structural member 62 such that the opening 74 extends generally transversely with respect to the structural member 62. The first and the second hinge members 66 and 72 are disposed on the base 44 such that the openings 68 and 74 are aligned. A portion of the structural member 62 is removed to provide a recessed portion 76 in the upper surface of the structural member 62 and the second hinge member 72 is disposed in the recessed portion.

The structural member 38 of the platform 16 extends through the respective openings 68 and 72 of the first and the second hinge members 66 and 72. The openings 68 and 72 each are sized with respect to the structural member 38 such that the structural member 38 is rotatable in a direction 78 and in an opposite direction 80 within the openings 68 and 72. The first and the second hinge members 66 and 72 each cooperate to hingedly connect the second end 52 of the base 44 to the first end 22 of the platform 16. Further, since the hinge members 66 and 72 are disposed in the recessed portions 70 and 76 in the upper surfaces of the structural members 60 and 62, the base 44 extends in a generally horizontal plane below the horizontal planar disposition of the platform 16 when both the platform 16 and the baes 44 are extending in a generally horizontal plane. By constructing and connecting the winch 82 and the opposite end of the cable 84 is connected to the platform 16 and the base 44 in this manner, any opportunity of the hinge connection between the platform 16 and base 44 catching on the end 15 of the deck 14 is substantially reduced.

As shown in FIGS. 5 and 6, the cargo loading apparatus 10 also includes a winch 82 which generally is supported on or near the cargo supporting surface 12 of the deck 14 and spaced a distance from the end 15 of the deck 14. The winch 82 has a cable 84 and is constructed to pull the cable 84 in a direction 86 when activated. One end of the cable 84 is connected to the first end 50 of the base 44 or, more particularly, to the structural member 64. Thus, the winch 82 pulls the cable 84 and the base 44 and platform 16 in the direction 86 generally toward the cargo supporting surface 12 of the deck 14 during the operation of the cargo loading apparatus.

In operation, the cargo to be loaded is supported on the cargo supporting surface 30 of the platform 16, and the platform 16 and the base 44 are positioned in an initial loading position (shown in FIG. 5) wherein the first end 22 of the platform 16 is disposed generally near the end 15 of the deck 14 and the platform 16 is supported generally on the first level. In this initial loading position, the base 44 extends angularly upwardly from the first end 22 of the platform 16 to a position wherein the first end 50 of the base 44 is generally above the second level or, in other words, generally above the cargo supporting surface 12 of the deck 14 and wherein the lower side 56 of the base 44 engages the end 15 of the deck 14. The positioning of the platform 16 and the base 44 in the initial loading position can be accomplished by moving a truck to the base 44 and platform 14 to a position wherein the end of the truck bed (cargo supporting surface 12) is positioned generally at the position shown in FIG. 5 with respect to the end 15 of the deck 14 and then moving the base 44 to the position shown in FIG. 5, for example.

After the platform 16 and the base 44 have been positioned in the initial loading position, one end of the cable 84 is connected to the first end 50 of the base 44 or, more particularly, to the structural member 64. The winch 82 then is activated to retrieve the cable 84 thereby pulling the cable 84 in the direction 86. The pulling of the cable 84 in the direction 86 causes the bae 44 and the platform 16 connected to be pulled in a general direction 86 generally toward the cargo supporting surface 12 of the deck 14. As the cable 84 is being pulled in the direction 86, the lower side 56 of the base 44 engages the end 15 of the deck 14 resulting in the first end 50 of the base 44 being moved in a direction 88 generally toward the cargo supporting surface 12 of the deck 14 and the second end 52 of the base 44 being moved in the direction 88 thereby moving the platform 16 generally toward the second level or, in other words, generally toward the cargo supporting surface 12. The base 44 acts as a fulcrum pivoting about the point of engagement between the base 44 and the end 15 of the deck 14 to raise the first end 22 portion of the platform 16 in an upward direction from the first level toward the second level.

As the cable 84 continues to be pulled in the direction 86, the base 44 is continued to be pullewd toward the cargo supporting surface 12 and the platform 16 is continued to be pulled in the upward direction from the first level to the second level of the cargo supporting surface 12 and toward the end 15. At a certain point in time, the area generally near the hinge connection between the platform 16 and the base 44 must pass over the end 15 of the deck 14, as shown in FIG. 6. Since the hinge connection (the first and second hinge member 66 and 72) is on the upper side 54 of the base 44 and since it is the lower side 56 of the base 44 which is in engagement with the end 15 of the deck 14, the hinge connection of the cargo loading apparatus 10 passes over the end 15 of the deck 14 without hanging on the end 15 in any manner which might restrict the movement of the platform 16 and base 44 onto the cargo supporting surface 12. After the base 44 and platform 16 have reached the position shown in FIG. 6, the winch 82 continues to retrieve the cable 84 until the base 44 and platform 16 have been moved completely onto the cargo supporting surface 12 thereby disposing the cargo supported on the cargo supporting surface 30 of the platform 16 onto the cargo supporting surface 12 of the deck 14.

Changes may be made in the construction and the operation of the various elements and assemblies described herein without departing from the spirit and the scope of the invention as defined in the following claims.

What is claimed is:

1. A cargo loading apparatus for loading cargo disposed generally on a first level onto a deck disposed generally on a second level a distance generally above the first level, the deck having a cargo supporting surface and an end, comprising:

a platform having a first side, a second side, a first end, a second end, an upper side, a lower side, and a cargo supporting surface extending generally between the first and the second sides and generally between the first and the second ends of the platform, the cargo to be loaded onto the deck being supportable on the cargo supporting surface of the platform;

a base having a first side, a second side, a first end, a second end, an upper side, and a lower side, the second end of the base being hingedly connected to the first end of the platform, the distance between the first and the second ends of the base being of a sufficient size so that the base and the platform are positionable in an initial loading position wherein the platform is supported generally on the first level and the base extends from the platform generally toward the deck to a position wherein the first end of the base is disposed a distance generally above the second level and the lower side of the base is engageable with the end of the deck; and means connectable to the base generally near the first end of the base for pulling the base and the platform connected thereto in a first direction onto the cargo supporting surface of the deck, the base engaging the end of the deck and cooperating to raise the platform connected thereto from the first level to the second level and subsequently onto the cargo supporting surface of the deck as said means pulls the deck and the platform in the first direction.

2. The cargo loading apparatus of claim 1 wherein the means for pulling the base and the platform is defined further to include:

a winch supportable near the second level; and
a cable having one end connected to the winch and the opposite end connected to the base, generally near the first end of the base.

3. The cargo loading apparatus of claim 1 wherein the platform is defined further to include:

four structural members interconnected to form a generally rectangular shape, one of the structural members extending generally along and forming the first side of the platform, one of the structural members extending generally along and forming the second side of the platform, one of the structural members extending generally along and forming the first end of the platform and one of the structural members extending generally along and forming the second end of the platform.

4. The cargo loading apparatus of claim 1 defined further to include:

a first hinge member connected to the upper side of the base generally near the second end and generally near the first side of the base, the first hinge member being hingedly connected to the platform generally near the first end and generally near the first side of the platform; and a second hinge member connected to the upper side of the base generally near the second end and generally near the second side of the base, the second hinge member being hingedly connected to the platform generally near the first end and generally near the second side of the platform.

5. The cargo loading apparatus of claim 4 wherein the first hinge member includes an opening extending therethrough and intersecting the opposite ends thereof, and wherein the second hinge member includes an opening extending therethrough and intersecting the opposite ends thereof, and wherein the first and the second hinge members are oriented such that the openings through the first and the second hinge members are aligned; and wherein the platform is further defined to include: at least one structural member extending along and generally forming the first end of the platform, portions of the structural member extending through each of the openings in the first and the second hinge members to hingedly connect the base to the platform.

6. The cargo loading apparatus of claim 5 wherein the base is defined further to include:
a structural member extending along and generally forming the first side of the base, a recessed portion being formed in the upper surface of the structural member generally near the second end of the base, the first hinge member being disposed within the recessed portion of the structural member; and
a structural member extending along and generally forming the second side of the base, a recessed portion being formed in the upper surface of the structural member generally near the second end of the base, the second hinge member being disposed within the recessed portion of the structural member.

7. The cargo loading apparatus of claim 6 wherein the base is defined further to include:
a structural member extending along and generally forming the first end of the base, the three structural members being connected to form a base frame.

8. The cargo loading apparatus of claim 1 defined further to include:
a plurality of spaced apart rails, each rail extending generally between the first and the second sides of the platform and each rail being connected to the base generally near the first side and generally near the second side of the platform, the rails forming the upper side of the platform and the rails providing the cargo supporting surface of the platform.

9. The cargo loading apparatus of claim 4 wherein the first and the second hinge members are oriented on the base such that the base lies in a horizontal plane generally below the horizontal planar disposition of the platform when the base and the platform each extend generally horizontally.

* * * * *

UNITED STATES PATENT AND TRADEMARK OFFICE
CERTIFICATE OF CORRECTION

PATENT NO. : 4,329,752
DATED : May 18, 1982
INVENTOR(S) : William J. Forrest

It is certified that error appears in the above—identified patent and that said Letters Patent is hereby corrected as shown below:

In column 4, line 46, the word "baes" should be --base--.

In column 4, lines 48 and 49, delete the words "the winch 82 and the opposite end of the cable 84 is connected to".

In column 4, line 59, after the phrase "connected to the", add the words --winch 82 and the opposite end of the cable 84 is connected to the--.

Signed and Sealed this

Seventeenth Day of August 1982

[SEAL]

Attest:

Attesting Officer

GERALD J. MOSSINGHOFF
Commissioner of Patents and Trademarks